United States Patent Office 2,955,010
Patented Oct. 4, 1960

2,955,010

PRINTING AND PAD-DYEING OF POLYACRYLO-NITRILE ARTICLES

Walter Fluegel and Arnold Dürst, Basel, Switzerland, assignors to Sandoz Ltd., Basel, Switzerland No Drawing. Filed Nov. 25, 1958, Ser. No. 776,211

Claims priority, application Germany June 11, 1954

11 Claims. (Cl. 8—62)

The present invention is a continuation-in-part application to the co-pending application Ser. No. 496,949, filed on March 25, 1955, now abandoned, and relates to a process for the printing or pad-dyeing of substrates consisting essentially of polyacrylonitrile.

It has been found that particularly good results in printing or pad-dyeing of polyacrylonitrile substrates are obtained by impregnating the said substrates with aqueous pastes or liquors containing a water-soluble organic dyestuff, e.g. a direct dyestuff, an acid dyestuff, a metallizable dyestuff or a metallized dyestuff, a water-soluble organic solvent, a thickener, cuprous oxide, preferably present in finely dispersed form, and a non-volatile acid or the ammonium salt thereof, and subsequently drying and steaming the resulting prints and pad-dyeings.

The polyacrylonitrile substrates can be printed in fabric or in slubbing form and pad-dyed in fabric form. The acid dyestuffs are preferably chosen from the group of the acid anthraquinone and acid azo dyestuffs. The metallizable dyestuffs possess metallizable groupings of the formula

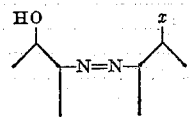

wherein $x$ represents a hydroxy, carboxylic acid or an amino group which latter may be substituted, and/or lake-forming ortho-hydroxy-carboxylic acid groupings, or lake-forming ortho-dihydroxy groupings. Drying of the printings or pad-dyeings is carried out preferably at 140–160° F., steaming at 220–265° F. The steaming temperature is determined by the physical properties of the printed or pad-dyed material; under no circumstances should it reach or exceed the melting temperature of the substrate.

The present invention also relates to the aqueous compositions for the printing or pad-dyeing of polyacrylonitrile substrates. The compositions consist essentially of a water-soluble organic dyestuff, e.g. a direct dyestuff, an acid dyestuff, a water-soluble organic solvent, a thickener, cuprous oxide, preferably present in finely dispersed form, and a non-volatile acid or the ammonium salt thereof. The optimum pH value during steaming lies between 2 and 4 and is adjusted by adding to the composition a non-volatile acid or the ammonium salt thereof, f.i. ammonium sulfate or phosphate, tartaric acid, citric acid, lactic acid etc.

It was not foreseen that the production of cuprous ions by the dissolving of the cuprous oxide could be achieved solely by the action of hot steam on a fabric or slubbing good printed or pad-dyed with a weakly acid printing paste or padding liquor and dried at 140–160° F. This, however, is the case. Despite the relatively "dry" atmospheric conditions, the dyestuffs are fixed in their correct shades and with full fastness properties.

The following examples illustrate the invention without in any way limiting its scope. The proportions refer to parts by weight. Temperatures are given in degrees Fahrenheit.

Example 1

A fabric of polyacrylonitrile staple fiber (Orlon 42) is printed with a paste of the following composition:

| | Parts |
|---|---|
| Xylene Light Yellow R 160% (Schultz Farbstofftabellen No. 736) | 15 |
| Thiodiethylene glycol | 50 |
| Water | 325 |
| Crystal gum 1:2 | 500 |
| Tartaric acid 1:1 | 60 |
| Cuprous oxide 1:1 | 50 |
| | 1000 |

The print is dried and steamed for 30 minutes at 225–230°, then rinsed cold and soaped at 120–140° with a sulphonated fatty alcohol. Given very good penetration of the fabric, a deep yellow print is obtained which is true to shade and has very good wet fastness properties.

A full violet print is obtained when using, instead of 15 parts of Xylene Light Yellow R 160%, 15 parts of Omega Chrome Violet B (Schultz Farbstofftabellen, 7th impression, volume II, p. 161).

By replacing the 15 parts of Xylene Light Yellow R 160% by 20 parts of the copper complex compound of the monoazo dyestuff obtained by coupling diazotized 2-amino-1-hydroxy-3,4,6-trichlorobenzene with 1-amino-8-hydroxynaphthalene-2,4-disulfonic acid, a brilliant blue print results.

Example 2

A fabric of polyacrylonitrile endless filament (Orlon 81) yarn is printed with a paste containing:

| | Parts |
|---|---|
| Omega Chrome Yellow ME (Schultz Farbstofftabellen, 7th impression, additional volume II, p. 221) | 15 |
| Pyridine base mixture | 20 |
| Water | 445 |
| Tragacanth 60:1000 | 400 |
| Citric acid 1:1 | 60 |
| Cuprous oxide 1:1 | 60 |
| | 1000 |

After drying the print is steamed for 20 minutes at 260°, rinsed in cold water, soaped and again rinsed cold. Upon drying, an attractive yellow print is obtained; the penetration of the fabric is very good.

By replacing the 15 parts of Omega Chrome Yellow ME by 20 parts of Omega Chrome Red B (Schultz Farbstofftabellen, No. 742), a full fast red print is obtained.

A brown print results when 20 parts of coppered 2,4-diamino - 2' - hydroxy - 5' - nitro - 1,1' - azobenzene - 5 - sulfonic acid is used instead of 15 parts of Omega Chrome Yellow ME.

The copper complex compound of the monoazo dyestuff obtained by coupling diazotized 1-amino-2-hydroxy-naphthalene-4-sulfonic acid with 2-hydroxy naphthalene yields a violet print.

Omega Chrome Red G (Schultz Farbstofftabellen, 7th impression, volume II, p. 161) and Omega Chrome Orange ML (Schultz Farbstofftabellen, 7th impression, volume II, p. 222) are similarly printed.

Example 3

Slubbing of polyacrylonitrile staple fiber is printed with a paste of the following composition:

| | Parts |
|---|---|
| Alizarine Red SZ (Schultz Farbstofftabellen No. 1145) | 30 |
| Butyl Carbitol | 50 |
| Water | 500 |
| Industrial gum 1:2 | 300 |
| Lactic acid 1:1 | 60 |
| Cuprous oxide 1:1 | 60 |
| | 1000 |

The print is steamed for 30 minutes at 220°, rinsed cold, soaped at 120° with a sulphonated fatty alcohol, rinsed again cold and dried. A full yellow print having very good fastness properties is obtained.

By replacing the 30 parts of Alizarine Red SZ by 8 parts of the sodium salt of 1-amino-4-(nitro-4'-methyl)-phenylaminoanthraquinone-2-sulfonic acid and steaming the obtained print for 20 minutes at 260°, rinsing cold and soaping, a fast attractive grey print is obtained.

Yellow and scarlet prints are obtained when incorporating into the printing paste, instead of 30 parts of Alizarine Red SZ, 30 parts of the sodium salt of 5-propionylamino-1.9-isothiazolanthrone - 1' - sulfonic acid and 30 parts of the lithium salt of 3'-benzoyl-4-amino-1.9-anthrapyridone-2-sulfonic acid respectively.

Example 4

| | Parts |
|---|---|
| Potassium salt of 1.4-diaminoanthraquinone-2-sulfonic acid | 15 |
| Pyridine | 100 |
| Hot Water | 565 |
| Crystal gum 1:2 | 200 |
| Citric acid 1:1 | 60 |
| Cuprous oxide 1:1 | 60 |
| | 1000 |

A padding liquor prepared with these ingredients is applied on a fabric of polyacrylonitrile staple fiber. The padded fabric is dried and steamed for 20 minutes at about 230° and 0.5 superatmospheric pressure. After an intermediate rinse with cold water, it is soaped at 140° with a fatty acid condensate, rinsed again and dried. The full violet pad-dyeing thus produced is fast to light, washing and rubbing.

If, instead of 15 parts of the potassium salt of 1,4-diaminoanthraquinone-2-sulfonic acid, 15 parts of the sodium salt of 1-amino-4-(4'-acetylamino)-phenylaminoanthraquinone-2.7-disulfonic acid are used, a pad-dyeing in a full blue shade of excellent fastness properties yields.

A green pad-dyeing is obtained by incorporating into the padding liquor 30 parts of the potassium salt of 1.4-di-(4'-methyl)-phenylaminoanthraquinone- disulfonic acid.

Example 5

A fabric of polyacrylonitrile staple fiber is printed with a paste of the following composition:

| | Parts |
|---|---|
| Sodium salt of 5-sulfoacetylamino-1.9-isothiazolanthrone | 30 |
| Butyl Carbitol | 50 |
| Water | 310 |
| Crystal gum 1:2 | 500 |
| Cuprous oxide 1:1 | 50 |
| Ammonium sulfate 1:2 | 60 |
| | 1000 |

The print is dried, steamed for 10 minutes at 220° without pressure and for 20 minutes at about 230° and at 0.5 superatmospheric pressure, then rinsed well with cold water, soaped at 120–140° with a fatty acid condensate and rinsed again. A full yellow print of very good fastness to light, washing and rubbing is obtained.

Also yellow print results, when the 30 parts of the sodium salt of 5-sulfoacetylamino-1.9-isothiazolanthrone are replaced by 30 parts of 4.4'-dihydroxy-5-sulfo-1.1'-azobenezne-3.3'-dicarboxylic acid, or the monoazo dyestuff obtained by coupling diazotized 2-amino-1-carboxy-benzene-4-sulfonic acid with 1-phenyl-3-methyl-5-pyrazolone. With 30 parts of 1-(3'-carboxy-4'-hydroxy-5'-methyl)-phenylazonaphthalene-4-sulfonic acid an orange-yellow print is obtained.

2.4.2' - trihydroxy - 3' - sulfo - 5' - chloro - 1.1' - azobenzene-5-carboxylic acid yields a yellowish brown print.

Example 6

The printing paste is prepared with:

| | Parts |
|---|---|
| Potassium salt of 1-aminoanthraquinone-2-sulfonic acid 200% | 30 |
| Butyl Carbitol | 50 |
| Hot water | 310 |
| Crystal gum 1:2 | 500 |
| Cuprous oxide 1:1 | 50 |
| Ammonium phosphate 3:4 | 60 |
| | 1000 |

This paste is printed on a fabric of polyacrylonitrile endless filament. The orange-colored print is finished as described in the preceding example. It possesses excellent fastness properties.

Example 7

A printing paste of:

| | Parts |
|---|---|
| Sodium salt of 1.4-diaminoanthraquinone-2-sulfonic acid | 15 |
| 1:1 mixture of ethanol and phenol | 100 |
| Water | 535 |
| Tragacanth 60:1000 | 300 |
| Cuprous oxide 1:1 | 20 |
| Ammonium sulfate 1:2 | 30 |
| | 1000 | is printed on slubbing of polyacrylonitrile staple fiber. The print is dried at 140°, steamed for 10 minutes at 220° without pressure and for 20 minutes at about 265° and at 1.6 superatmospheric pressure. It is then rinsed with cold water, soaped at 120–140° with a sulfonated fatty alcohol, rinsed again and dried. A violet print is obtained which is fast to light, washing and rubbing. The penetration of the fabric is very good.

Example 8

| | Parts |
|---|---|
| Potassium salt of 1-amino-4-cyclohexylaminoanthraquinone-2.7-disulfonic acid | 15 |
| Butyl Carbitol | 50 |
| Water | 575 |
| Crystal gum 1:2 | 250 |
| Cuprous oxide 1:1 | 50 |
| Ammonium phosphate 3:4 | 60 |
| | 1000 |

A padding liquor of the above composition is pad-dyed on a fabric of polyacrylonitrile endless filament. The pad-dyeing is finished as described in Example 4. It is blue in shade and is fast to light, washing and rubbing.

Example 9

A padding liquor containing:

| | Parts |
|---|---|
| Lithium salt of 1-amino-4-phenylaminoanthraquinone-2-sulfonic acid | 15 |
| Thiodiethylene glycol | 100 |
| Water | 535 |
| Crystal gum 1:2 | 300 |
| Cuprous oxide 1:1 | 20 |
| Ammonium sulfate 1:2 | 30 |
| | 1000 | is applied upon a fabric of polyacrylonitrile endless filament. The padded fabric is dried, steamed for 15 minutes at 260° and about 1.3 superatmospheric pressure, then rinsed in cold water and soaped at 120–140° with a sulfonated fatty alcohol. After a second rinse and drying, a blue print is obtained which is fast to light, washing and rubbing.

Example 10

Useful dyestuffs for carrying out the process disclosed in the Examples 1 to 9 are also:

The copper complex compound of the monoazo dyestuff obtained by coupling diazotized 1-amino-2-hydroxy-naphthalene-4-sulfonic acid with 1-phenyl-3-methyl-5-pyrazolone (printing and pad-dyeing red shades);

The copper complex compound of the monoazo dyestuff obtained by coupling diazotized 2-amino-1-hydroxy-4-chlorobenzene with 1-hydroxynaphthalene-4-sulfonic acid (red-violet);

The nickel complex compound of the monoazo dyestuff obtained by coupling diazotized 1-amino-2-hydroxy-naphthalene-4-sulfonic acid with 1-phenyl-3-methyl-5-pyrazolone (ruby).

Having thus disclosed the invention, what is claimed is:

1. A process of printing and pad-dyeing polyacrylonitrile substrates which consists essentially of impregnating the polyacrylonitrile substrates with aqueous pastes containing a water-soluble organic dyestuff selected from the group consisting of direct dyestuffs, acid dyestuffs and metallizable and metallized dyestuffs, a water-soluble organic solvent, a thickener, cuprous oxide and a member selected from the group consisting of non-volatile acids and the ammonium salts thereof, and subsequently drying and steaming the resulting prints and pad-dyeings.

2. A process according to claim 1, wherein the substrate is in fabric form.
3. A process according to claim 1, wherein the substrate is in slubbing form.
4. A process according to claim 1, wherein the metallizable dyestuffs contain lake-forming ortho-hydroxy-carboxylic acid groupings.
5. A process according to claim 1, wherein the metallizable dyestuffs contain lake-forming ortho-dihydroxy groupings.
6. A process according to claim 1, wherein the cuprous oxide is applied in finely dispersed form.
7. A process according to claim 1, wherein the prints and pad-dyeings are dried at 140–160° F. and steamed at 220–265° F. and at a pH of between 2 and 4.
8. A process according to claim 1, wherein the metallizable dyestuffs contain metallizable groupings of the formula

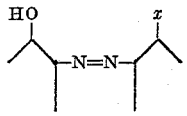

(a)

wherein $x$ stands for a member selected from the group consisting of a hydroxy, carboxylic acid and amino group.

9. A process according to claim 8, wherein the metallizable dyestuffs contain metallizable groupings of the Formula $a$ as well as lake-forming ortho-hydroxy-carboxylic acid groupings.

10. An aqueous composition for the printing and pad-dyeing of polyacrylonitrile substrates which consists essentially of a water-soluble organic dyestuff selected from the group consisting of direct dyestuffs, acid dyestuffs and metallizable and metallized dyestuffs, a water-soluble organic solvent, a thickener, cuprous oxide and a member selected from the group consisting of non-volatile acids and the ammonium salts thereof.

11. An aqueous composition according to claim 10, wherein the cuprous oxide is present in finely dispersed form.

References Cited in the file of this patent
UNITED STATES PATENTS

| 2,653,074 | Blaker | Sept. 22, 1953 |
| 2,743,991 | Schoonover | May 1, 1956 |